H. J. LEBHERZ.
COMBINED TOOTH BRUSH AND PASTE TUBE HOLDER.
APPLICATION FILED NOV. 21, 1910.
1,005,985.
Patented Oct. 17, 1911.
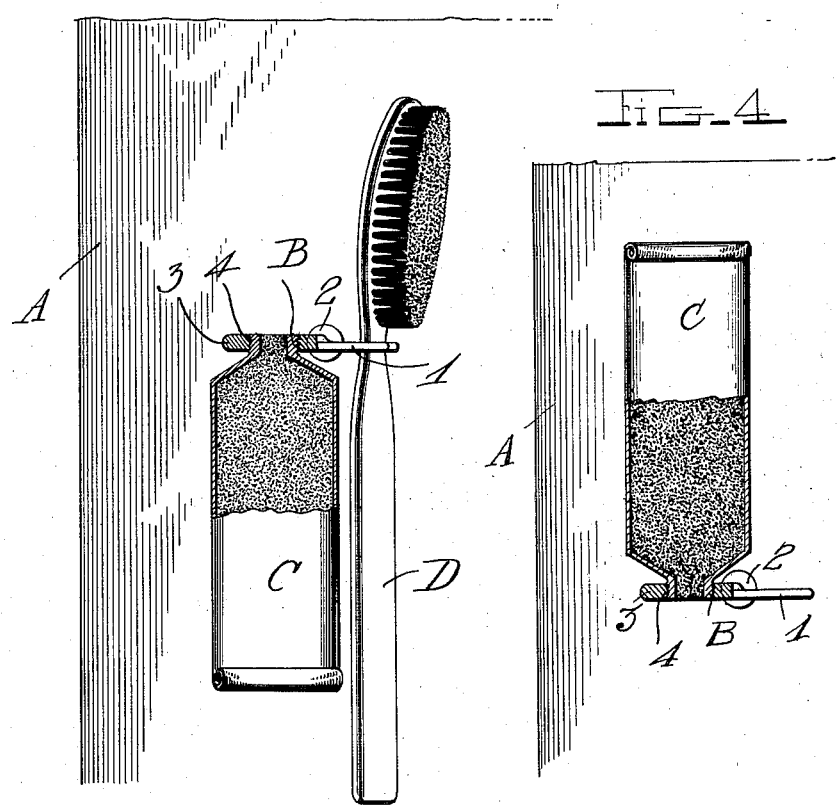
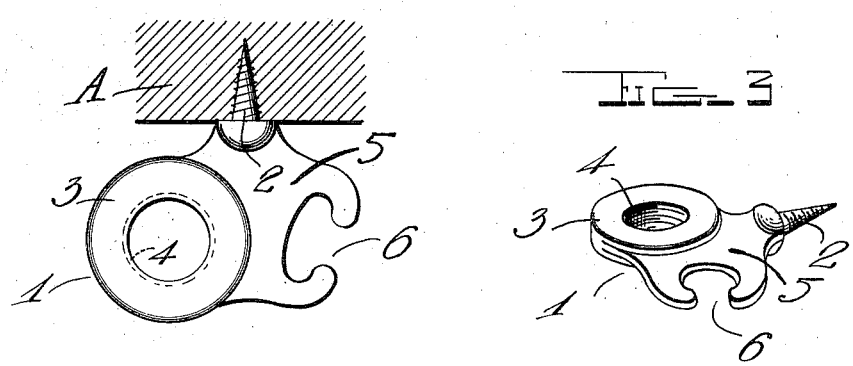
Witnesses
O. B. Hopkins
Inventor
Harry J. Lebherz
by H. B. Willson & Co.
Attorneys

UNITED STATES PATENT OFFICE.

HARRY J. LEBHERZ, OF FREDERICK, MARYLAND.

COMBINED TOOTH-BRUSH AND PASTE-TUBE HOLDER.

1,005,985. Specification of Letters Patent. Patented Oct. 17, 1911.

Application filed November 21, 1910. Serial No. 593,425.

*To all whom it may concern:*

Be it known that I, HARRY J. LEBHERZ, a citizen of the United States, residing at Frederick, in the county of Frederick and State of Maryland, have invented certain new and useful Improvements in Combined Tooth-Brush and Paste-Tube Holders; and I do declare the following to be a full, clear, and exact description of the invention, such as will enable others skilled in the art to which it appertains to make and use the same.

This invention relates to a combined tooth brush and paste tube holder.

The object of the invention is to provide simple and efficient means for holding a paste tube in position to enable an effective and economical transfer of the paste from the tube to the brush.

Another object of the invention is to provide a simply constructed holder for holding a paste tube with its mouth arranged in a horizontal plane ready for the passage of the brush thereover and having means for detachably supporting the brush when not in use.

With these and other objects in view, the invention consists of certain novel features of construction, combination and arrangement of parts as will be more fully described and particularly pointed out in the appended claim.

In the accompanying drawings: Figure 1 represents a front elevation of a support with this improved holder secured thereto and with a paste tube and brush arranged in position in said holder. Fig. 2 is a horizontal section through said support with the holder shown in top plan view; Fig. 3 is a perspective view of the holder detached. Fig. 4 is a view similar to that shown in Fig. 1, with the tube arranged in inverted position.

In the illustrative embodiment of the invention, 1 represents a holder preferably constructed from metal which is substantially triangular in outline and having a screw threaded shank 2 extending laterally therefrom, whereby the device may be attached to a bath cabinet, wall or other suitable support A. The screw threaded shank 2 is properly seated within an enlarged portion of the plate and projects therefrom whereby the said shank is rigidly secured to the plate. The plate is provided with a thick portion having a screw threaded aperture 4 for removably receiving the screw threaded neck B of a paste tube C, as clearly shown in Figs. 1 and 4, whereby the said tube is adapted to be reversely adjusted in respect to the holder or plate. The plate or holder, is also provided with a reduced portion 5 having a tooth brush receiving opening 6 whereby the tooth brush is removably supported and held in a vertical position as clearly shown in Fig. 1.

As clearly shown in Figs. 2 and 3, the screw attaching shank 2 is centrally disposed between the screw threaded aperture 4 and the tooth brush receiving opening 6, of the reduced portion 5 of the holder, and it will be clearly observed that when the paste tube C is adjusted in either position upon the holder the same will not come in contact with the tooth brush B or prevent its convenient removal from the holder.

In Fig. 4 the tube is shown supported in inverted position with its mouth arranged below the bracket, in which position said mouth is protected against dust settling on the exposed paste, as it is desired that the cap be normally removed in order that the paste may be always ready for use without necessitating the removal of the cap.

By the use of this holder a simple and efficient paste tube and brush holder is provided in which the tube $c$ will be supported with its mouth in convenient position for the drawing of the bristles of the brush across it, whereby the paste ejected from the tube will be forced well into the bristles and the inconvenience of having the paste roll off the brush is avoided.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

I claim as my invention:—

As an article of manufacture the herein described holder composed of a single piece of metal having a reduced tooth brush receiving portion, the thick portion of said holder being provided with a screw threaded aperture for removably receiving the screw threaded neck of a paste tube, and a screw threaded attaching shank centrally disposed between the screw threaded aperture and the tooth brush reduced receiving portion whereby the delivery end of the paste tube is adapted to be reversibly adjusted in respect to the holder.

In testimony whereof I have hereunto set my hand in presence of two subscribing witnesses.

HARRY J. LEBHERZ.

Witnesses:
 CHARLES S. PRICE,
 GEORGE C. DOLL.